Dec. 24, 1968    F. A. NELSON    3,418,564
FIELD MODULATED GYROMAGNETIC RESONANCE SPECTROMETER
DETECTING ONLY THE F.M. CARRIER RESONANCE COMPONENT
Filed April 11, 1966    3 Sheets-Sheet 1

INVENTOR.
FORREST A. NELSON
BY
ATTORNEY

INVENTOR.
FORREST A. NELSON
BY
ATTORNEY

Dec. 24, 1968     F. A. NELSON     3,418,564
FIELD MODULATED GYROMAGNETIC RESONANCE SPECTROMETER
DETECTING ONLY THE F.M. CARRIER RESONANCE COMPONENT
Filed April 11, 1966     3 Sheets-Sheet 3
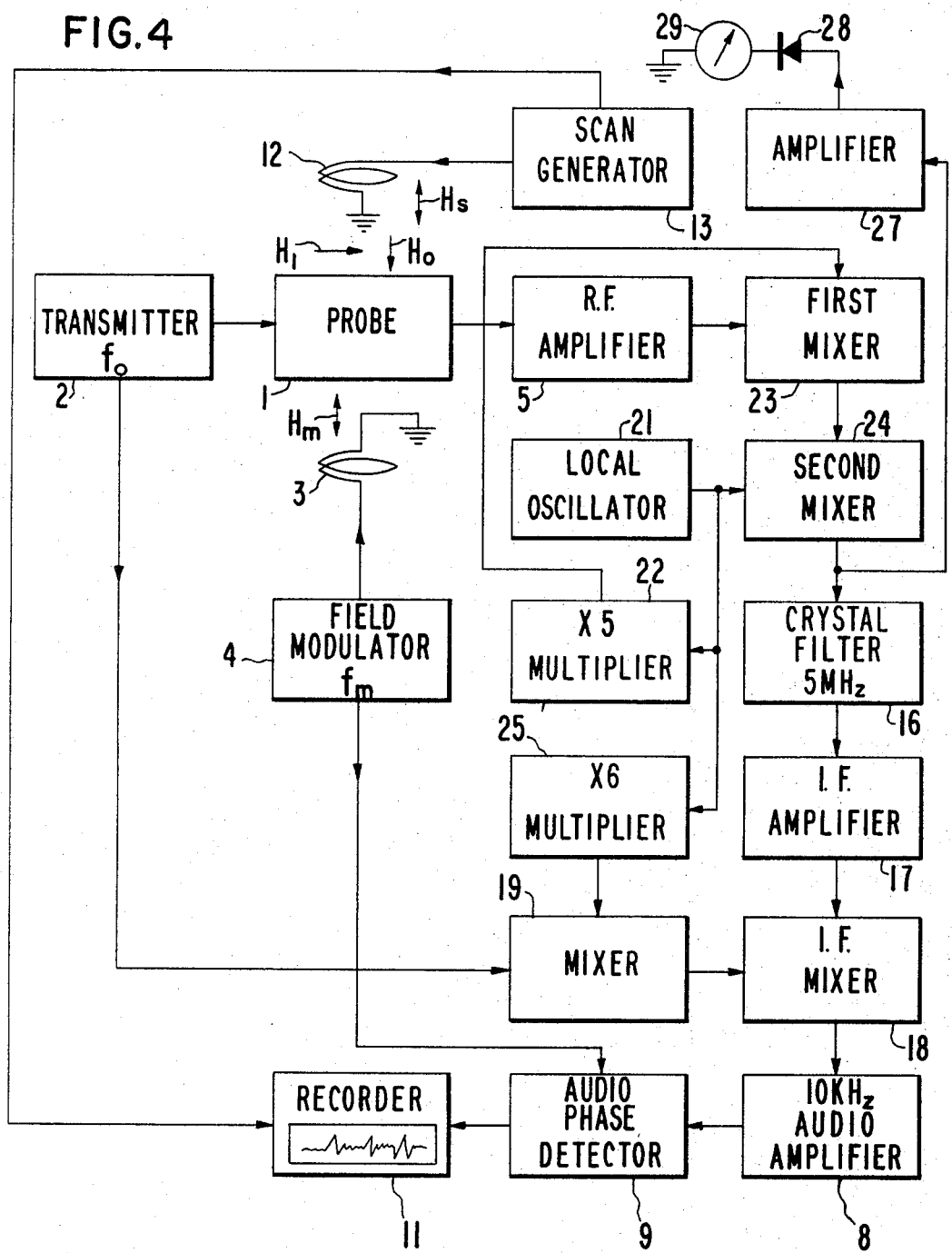
INVENTOR.
FORREST A. NELSON United States Patent Office 3,418,564
Patented Dec. 24, 1968

3,418,564
FIELD MODULATED GYROMAGNETIC RESONANCE SPECTROMETER DETECTING ONLY THE FM CARRIER RESONANCE COMPONENT
Forrest A. Nelson, Palo Alto, Calif., assignor to Varian Associates, Palo Alto, Calif., a corporation of California
Filed Apr. 11, 1966, Ser. No. 541,564
10 Claims. (Cl. 324—.5)

ABSTRACT OF THE DISCLOSURE

A gyromagnetic resonance spectrometer is disclosed. The spectrometer includes a probe structure for immersing a gyromagnetic resonance sample to be analyzed into an alternating magnetic AC field and a direct DC magnetic field, which latter field is directed at a substantial angle to the direction of the alternating magnetic field. A modulator is provided for modulating either the frequency of the AC magnetic field or the intensity of the DC magnetic field at a certain modulation frequency corresponding to the difference frequency between the gyromagnetic resonance frequency and the frequency of the AC magnetic field to excite gyromagnetic resonance of the sample under analysis. The excited gyromagnetic resonance is a frequency modulated resonance spectrum which contains a carrier frequency component and FM sideband components having Bessel function amplitudes. The resonance information is contained in the carrier component and is duplicated in the sidebands. The FM resonance signal is picked up in a receiver. The receiver contains any one of a number of various different electronic circuits for detecting the carrier frequency component and eliminating therefrom all FM sideband components as well as the noise bandwidth associated therewith to produce an output signal having enhanced signal-to-noise ratio. The various electronic circuits for eliminating the sideband components include filters, stages of phase sensitive detection, and combinations of both.

---

Figure 1:
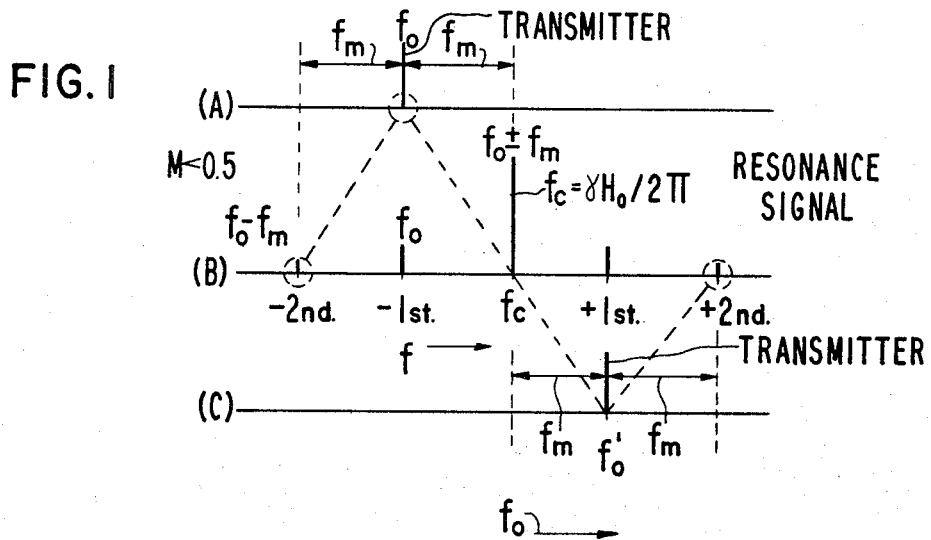

Heretofore, field modulated gyromagnetic resonance spectrometers have been built wherein the transmitter frequency was displaced from the resonance frequency of the sample under analysis by the field modulation frequency. In such a spectrometer, frequency modulated resonance of the sample is produced. That is to say, the excited resonance signal has a carrier component at the resonance frequency with sideband components having characteristic Bessel function amplitudes separated in frequency by the field modulation frequency.

Such systems have the advantage of ease of probe balance and base line stability compared to systems wherein the transmitter signal is at the same frequency as the resonance signal since some transmitter signal inevitably leaks through the probe into the receiver tending to overload same and to pass through the RF receiver with the resonance signal. However, when the transmitter is at a different frequency, discrimination against the adverse effects of the transmitter signal is more easily accomplished. More specifically, with the transmitter frequency separated from the resonance signal by the field modulation frequency, the transmitter signal may be heterodyned in the receiver with the FM resonance signal to produce an audio frequency beat resonance signal at the field modulation frequency which may then be conveniently phase sensitive detected against the field modulation signal to produce a DC resonance signal for recording. The problem with this prior system is that the resonance signal is an FM resonance signal with sidebands separated by the field modulation frequency and when heterodyned with the offset transmitter frequency the beat resonance signal contains the noise bandwidth associated not only with the desired carrier resonance component but also the noise associated with one of the second FM sideband components. The second sideband signal component represents only about 0.5% of the signal amplitude of the carrier component, for low frequency modulation indexes, as used, but has equal noise content. Therefore, the overall signal to noise ratio for the aforedescribed spectrometer was less than optimum.

In the present invention, the weak second FM sideband component of the gyromagnetic resonance signal is eliminated, along with is associated noise bandwidth, from the detected resonance carrier component, whereby the signal to noise ratio of the spectrometer is improved by a factor of approximately $\sqrt{2}$.

The principal object of the present invention is the provision of an improved gyromagnetic resonance spectrometer.

One feature of the present invention is the provision of a gyromagnetic resonance spectrometer including, means for eliminating from the resonance detector a second FM sideband component of an excited FM gyromagnetic resonance signal and the noise near the frequency of the sideband whereby the signal to noise ratio is substantially enhanced.

Another feature of the present invention is the same as the preceding wherein the means for eliminating the second sideband component is either a band reject or band pass filter connected in the receiver channel of the spectrometer to reject the spectral energy at frequencies near an interfering second sideband component of the resonance signal while passing the fundamental (carrier) component.

Another feature of the present invention is the same as the first wherein the means for eliminating the second sideband component comprises means for generating a sideband of the transmitter signal at the frequency of the carrier resonance component and heterodyning the transmitter sideband signal with the carrier resonance component to produce DC resonance signal.

Another feature of the present invention is the same as any one or more of the preceding features wherein the eliminated second sideband component is eliminated in an intermediate frequency stage of the resonance receiver circuitry, whereby elimination is more easily achieved.

Other features and advantages of the present invention will become apparent upon a perusal of the following specification taken in connection with the accompanying drawings wherein:

FIGS. 1A, 1B and 1C are spectrum diagrams for the RF transmitter and FM gyromagnetic resonance, and FIGS. 2, 3, 4 and 5 are block diagrams for alternative gyromagnetic resonance spectrometers using features of the present invention.

Referring now to FIG. 1B, there is shown the FM resonance spectrum of an excited group of gyromagnetic resonant bodies having a single natural resonance line at a frequency $f_c$ equal to $\gamma H_0/2\pi$, where $\gamma$ is the gyromagnetic ratio for the group of bodies and $H_0$ is the polarizing magnetic field intensity. As seen from the spectrum 1B, the resonance line has a carrier frequency component at $f_c = \gamma H_0/2\pi$ with sideband components separated by the modulation frequency $f_m$ and having amplitudes determined by Bessel functions of the modulation index M.

A convenient way to excite FM resonance of the gyromagnetic bodies is to immerse the bodies in crossed AC and DC magnetic fields and to modulate one of the fields, for example, the DC field at a convenient modulation frequency $f_m$ such as 10 kHz. The frequency $f_0$ of the AC magnetic field $H_1$ is then selected to be displaced from the resonance frequency $f_c$ of the gyromagnetic bodies by the modulation frequency $f_m$. In this manner the gyromagnetic bodies are excited into FM resonance by the first FM sideband of the applied AC magnetic fields.

The carrier frequency $f_c$ of the FM resonance is to be detected by the receiver and since this frequency $f_c$ is displaced from the transmitter frequency $f_0$ probe unbalance, receiver saturation and base line instability are more easily avoided. One low noise method for detecting the carrier component of the resonance signal is to heterodyne, in the receiver, the FM resonance signal with the transmitter frequency $f_0$ or $f_0'$ displaced from the resonance carrier frequency $f_c$ by the modulation frequency $f_m$ (see FIGS. 1A, 1B and 1C) to produce a beat frequency resonance spectrum with sideband resonance lines separated by the modulation frequency. More particularly, the carrier resonance component will appear as a beat or difference frequency signal at the modulation frequency. Phase sensitive detection of the beat signal with a reference at the field modulation frequency followed by a low pass filter will yield the carrier component and one of its second sidebands while eliminating all other sidebands. This has been the prior art detection method, described above, and, while having many advantages, does introduce unwanted noise bandwidth associated with the one second sideband of the FM resonance signal.

Figure 2:
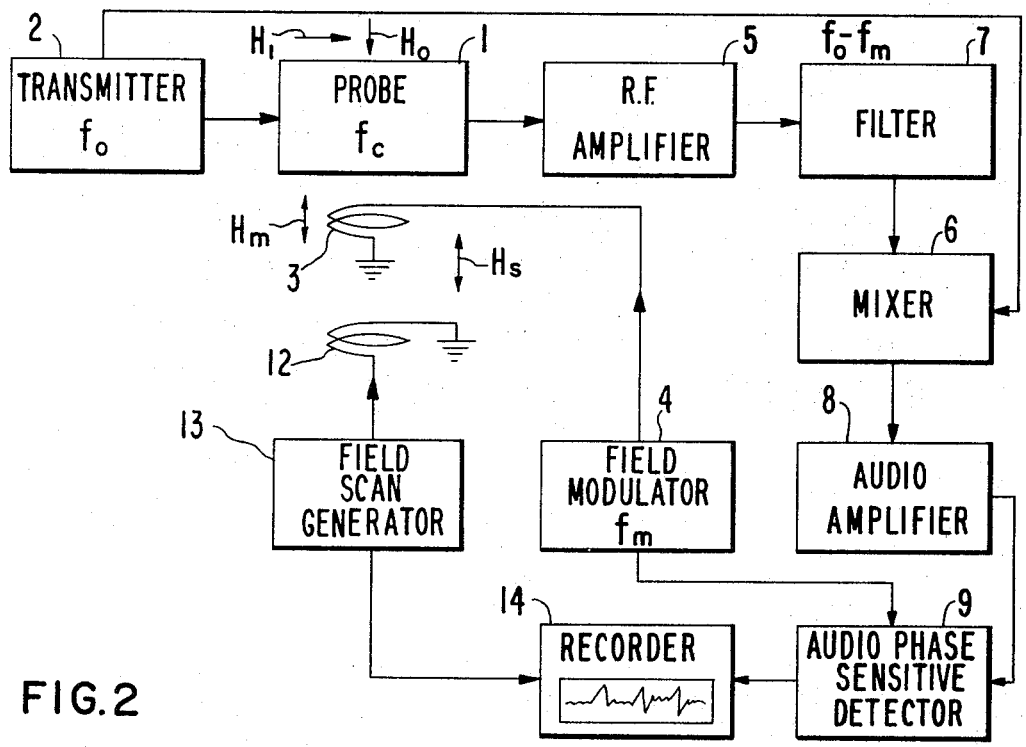

Referring now to FIG. 2, there is shown a spectrometer of the present invention wherein the unwanted second sideband spectral zone is filtered out of the resonance spectrum before heterodyning to produce the beat spectrum containing the carrier as a beat note at the modulation frequency. In this manner, the noise associated with as well as the second sideband is eliminated thereby increasing the signal to noise ratio for the detected resonance by a factor of approximately $\sqrt{2}$.

In FIG. 2, a sample of matter containing a group of gyromagnetic bodies to be analyzed is placed in a conventional probe structure 1 and immersed in a DC polarizing magnetic field $H_0$ as of 14.1 kg. produced by a suitable electromagnet, not shown. In the polarizing magnetic field $H_0$ the bodies such as protons, will have a gyromagnetic resonance frequency $f_c$ as of 60 mHz. An AC magnetic field $H_1$, as derived from a transmitter 2, is applied to the sample at right angles to the direction of the polarizing magnetic field $H_0$. The AC magnetic field $H_1$ is an RF field having a frequency $f_0$ displaced from the sample resonance frequency $f_c$ by a convenient field modulation frequency $f_m$ as of 10 kHz. The polarizing magnetic field $H_0$ is modulated with a modulating field $H_m$ parallel to $H_0$ via modulation coil 3 at the field modulation frequency $f_m$ deriving its current from a field modulator 4.

The field modulation $H_m$, as combined with the applied AC magnetic field $H_1$ in the polarizing magnetic field $H_0$, produces FM resonance of the sample gyromagnetic bodies at the resonance carrier frequency $f_c$. The resonance signals emanating from the FM resonating sample also include upper and lower sidebands separated by the field modulation frequency $f_m$, as shown in the diagram of FIG. 1B. These sidebands have relative amplitudes as determined by their respective order of Bessel function of the DC field modulation index M. A suitable field modulation index M falls within the range of 0.1 to 1.0 and preferably within the range of 0.1 to 0.3.

The FM resonance signal is picked up by a conventional coil structure within the probe 1 and fed to an RF amplifier 5 wherein it is amplified and fed to a mixer 6 via a filter 7. In the mixer 6 the FM resonance components passed by the filter 7 are heterodyned with a transmitter reference signal at frequency $f_0$ to obtain a beat FM resonance spectrum having resonance line components separated by the modulation frequency $f_m$. The carrier resonance line component, for either case of the transmitter signal $f_0$ or $f_0'$ being above or below the carrier resonance frequency $f_c$ appears at the field modulation frequency $f_m$ as seen by the dashed lines interconnecting diagrams 1A, 1B and 1C. Note also that the second lower sideband for $f_0$ and the second upper sideband for $f_0'$ also have a different beat frequency with the transmitter frequency $f_0$ at the field modulation frequency $f_m$ and unless otherwise eliminated would appear along with an attendant bandwidth of noise in the beat note, at the frequency $f_m$, which is the desired carrier resonance component frequency. At a field modulation index M of 0.25 the resonance signal in the second sideband component often is only 0.5% of the amplitude of the carrier component amplitude, but has essentially the same noise content as the carrier component. Thus filter 7 is designed to reject the unwanted second sideband component before heterodyning in the mixer 6. In this manner the signal to noise ratio for the detected carrier signal is increased by $\sqrt{2}$ since the noise bandwidth of the second sideband is eliminated.

Filter 7 may be either a band pass filter tuned to pass the FM carrier and reject the other FM sideband components or, in the alternative, may be a band reject filter tuned to reject the unwanted second sideband, which, as pointed out above, may be either the upper or lower second FM sideband depending upon whether the transmitter frequency $f_0$ or $f_0'$ is above or below the frequency of the FM resonance carrier component $f_c$. If the transmitter frequency $f_0'$ is above the frequency $f_c$, then the upper second FM resonance component is rejected by filter 7. If the transmitter frequency $f_0$ is below the frequency of the resonance carrier $f_c$, then the second lower sideband is rejected by filter 7.

A suitable band reject filter 7 for rejecting the resonance second sideband would be a filter having the center of its reject band tuned for $f_0-10$ kHz. for a $f_0<f_c$, and $f_0+10$ kHz. for a $f_0>f_c$. The reject filter 7 would have a band reject of 10–20 db over a range of 10 kHz. A suitable band pass filter 7 would have a pass band of 10 kHz. centered on the carrier resonance component frequency $f_c$ and providing at least 10–20 db and preferably 40–50 db rejection outside the pass band.

The output of the mixer 6 is fed to an audio frequency amplifier 8 wherein it is amplified and fed to one input terminal of an audio frequency, i.e. 10 kHz., phase sensitive detector 9 and compared therein with a reference at 10 kHz. obtained from the field modulator 4. The phase sensitive detector 9 eliminates all the remaining FM resonance sideband components other than the carrier component and converts the carrier component into a DC output signal which is fed to a recorder 11. The resonance carrier signal is recorded as a function of a scan of the resonance conditions, such as the polarizing magnetic field intensity $H_0$, to produce a recorded output resonance spectrum having exceptionally high signal to noise ratio. The scan is obtained by scanning the polarizing magnetic field $H_0$ via a variable DC current applied to field bias coils 12 from a field scan source 13. A sample of the scan signal as derived from the source 12 is fed to the recorder 11.

Figure 3:
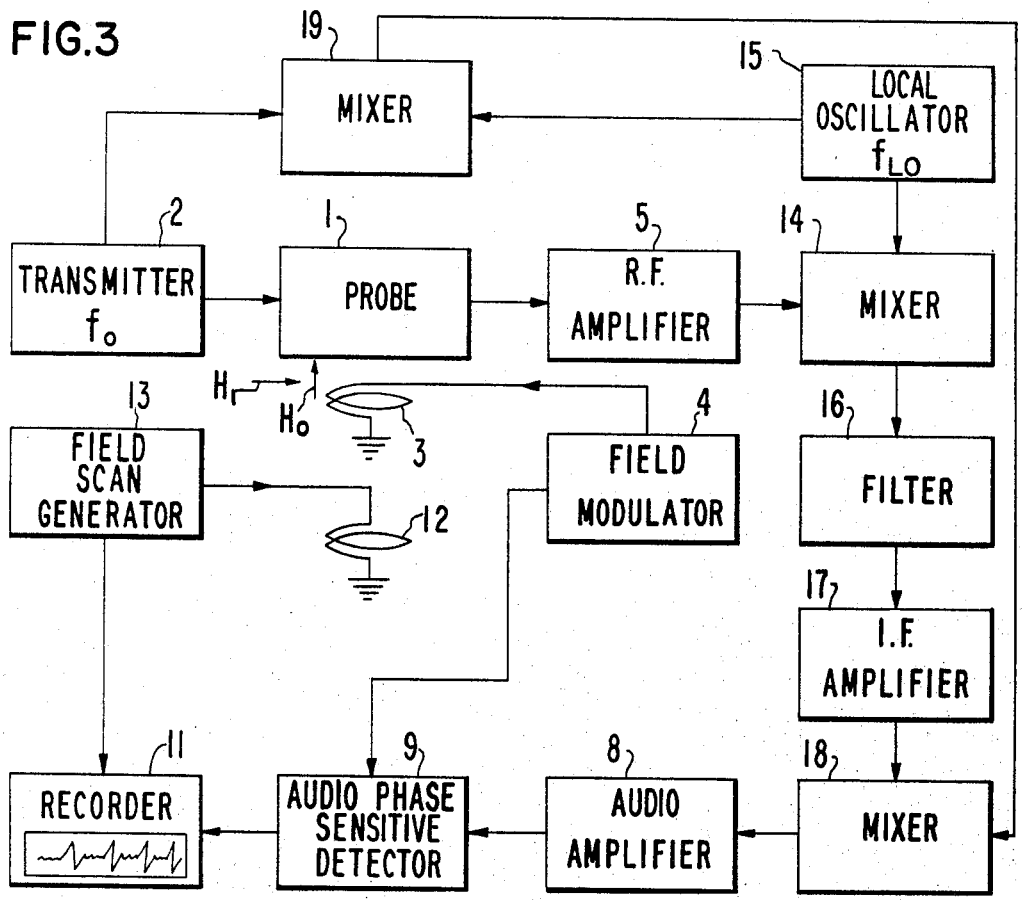

Referring now to FIG. 3, there is shown an alternative gyromagnetic resonance spectrometer employing features of the present invention. In this embodiment, the same reference numerals will be used to identify the same elements as previously described in FIG. 2 and only the differences between the spectrometers will be described in detail. Essentially this system is the same as that of FIG. 2 except that an intermediate frequency IF stage is provided with the filter designed for operation at the lower IF frequency rather than the much higher transmitter frequency $f_0$. Thus filter performance is improved and fabrication costs reduced.

In FIG. 3 the RF FM resonance spectrum output of the RF amplifier 5 is mixed in mixer 14 with a frequency $f_{Lo}$ derived from a local oscillator 15, as of 55 mHz., to produce an intermediate frequency FM resonance spectrum at a convenient IF as of, for example, 5 mHz. A filter 16, which as previously described may be either a band reject or band pass, is designed for operation at a lower IF frequency band and thus its desired performance is more easily achieved than at higher RF frequencies as of 60 mHz. In this case, the filter 16 would be tuned as previously described except that the frequencies $f_o$ and $f_c$ are now the transposed IF equivalent frequencies, i.e., $(f_o - f_{Lo})$ and $(f_c - f_{Lo})$, respectively.

The IF FM resonance spectrum, minus the rejected unwanted second FM sideband, is amplified in IF amplifier 17 and fed to one input terminal of an IF mixer 18. In the mixer the IF spectrum is mixed with a transposed IF transmitter signal, i.e., $(f_o - f_{Lo})$ to produce the audio frequency beat spectrum, as previously obtained in the output of mixer 6 of FIG. 2. The transposed IF transmitter signal $(f_o - f_{Lo})$ is obtained from the output of a mixer 19 wherein the transmitter signal $f_o$ is heterodyned with a signal derived from the local oscillator 15 to produce $(f_o - f_{Lo})$. The remaining part of the spectrometer is identical to that described with regard to FIG. 2.

Referring now to FIG. 4, there is shown an alternative gyromagnetic resonance spectrometer employing features of the present invention. This spectrometer is designed for operation at a carreir resonance frequency $f_c$ of about 250 mHz. with a superconducting solenoid to provide $H_o$ of about 58 kg. and differs from the system of FIG. 3 in that the IF local oscillator provides frequencies for producing two IF frequencies for better image frequency rejection.

More particularly, a local oscillator 21 provides an output frequency $f_{Lo}$ of 40.835 mHz. which is multiplied by 5 in multiplier 22 to 204.175 mHz. and applied to one terminal of a first RF mixer 23 to transpose the FM resonance carrier component at $f_c = (f_o + f_m)$, i.e. 250.010 kHz. to a first IF frequency of 45.835 mHz. This first IF is then mixed in a second mixer 24 with the local oscillator frequency of 40.835 mHz. to transpose the carrier component of the FM resonance signal to 5 mHz. which is then passed by a crystal band pass filter 16. The filter 16 has a band pass as of 10 kHz. centered at the IF FM carrier resonance frequency $f_c$ of 5 mHz. and provides 40–50 db attenuation for the sideband components of the FM resonance signal. The output of the second mixer 24 is actually $f_c - 6f_{Lo}$. Thus, the local oscillator frequency $f_{Lo}$ is multiplied by 6 in multiplier 25 and fed to mixer 19 wherein it is heterodyned with the transmitter frequency to provide $f_o - 6f_{Lo}$ for applying to the IF mixer 18 to transpose the 5 mHz. IF FM resonance carrier to the audio beat frequency of 10 kHz. corresponding to the field modulation frequency $f_m$. The audio carrier resonance signal is then phase detected in phase detector 9, as previously described with regard to the systems of FIGS. 2 and 3.

The spectrometer of FIG. 4 also includes a probe balancing circuit for sensing probe unbalance such that trimming adjustments in the probe 1 can be effected to reduce saturation of the RF amplifier 5 and overloading of the other elements of the circuit. The probe 1 may be of any conventional single or crossed coil type. The probe balance network includes a 5 mHz. amplifier 27 connected to the IF output of the second mixer 24. Probe unbalance will cause a large IF transmitter component at 4.900 mHz. to appear in the output of the second mixer 24. This leakage component is always much larger than the desired signal component at 5 mHz. The transmitter leakage component is amplified in amplifier 27, rectified by rectifier 28 and measured by DC current meter 29. The probe 1 is balanced by tuning the probe 1 for a minimum reading on the meter 29.

Figure 5:
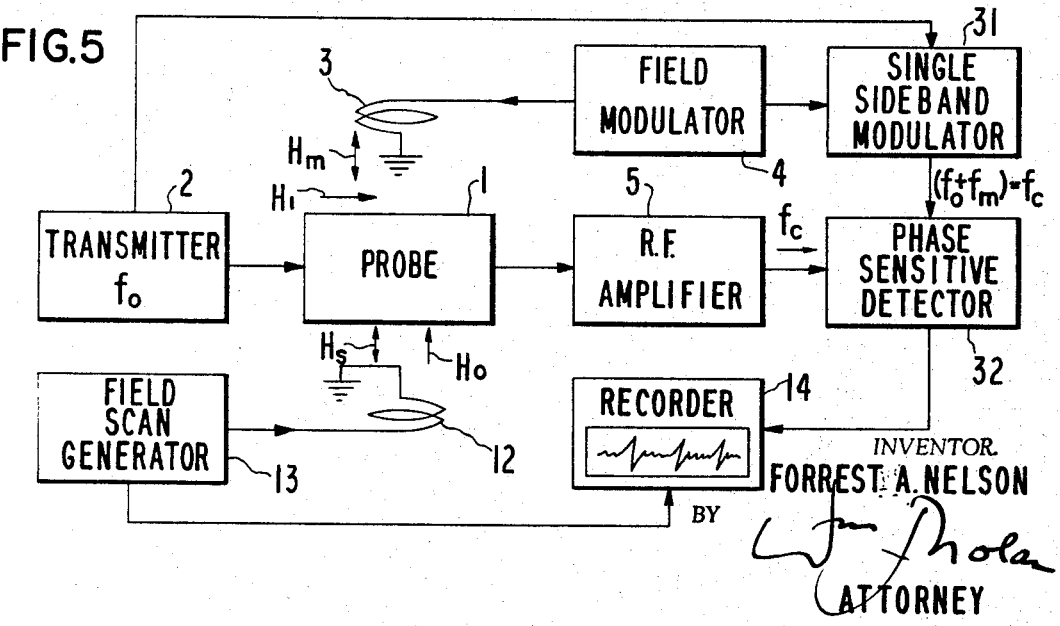

Referring now to FIG. 5, there is shown an alternative embodiment of the present invention wherein the undesired sideband components are eliminated from the detected carrier component of the resonance signal. In this embodiment a single sideband generator is employed to generate a sideband of the transmitter signal $f_o$ at the carrier resonance component frequency $f_c$. The sideband is heterodyned with the detected FM resonance spectrum to produce a DC resonance output signal having only the noise and signal in the spectral zone of the resonance carrier component.

More specifically, a sample of the output of the transmitter signal at $f_o$ is fed to one input terminal of a single sideband generator 31 wherein it is modulated with a signal at $f_m$ derived from the field modulator 4 to produce an output at $f_c$. The output of the single sideband generator 31 at $f_c$ is fed to one input of a phase sensitive detector 32 for comparison with the FM resonance spectrum signal. The output of the phase sensitive detector 32 is a DC signal containing the resonance information and noise in the spectral zone of the carrier component of the resonance signal while eliminating all other noise and sideband components. The phase sensitive detector typically employs a low pass filter in its output to facilitate removal of undesired bandwidth. The output of the phase sensitive detector 32 is recorded in recorder 14.

Although the single sideband generator method of FIG. 5 was described as used in the least complicated spectrometer it is also equally applicable to more complicated spectrometer systems using one or more IF stages such as were employed in the spectrometers of FIGS. 3 and 4, above described. In such spectrometers, employing one or more IF stages, the single sideband signal, as derived from the transmitter and at the same frequency as the carrier resonance component, would be introduced with the resonance carrier component into a phase sensitive detector 32 located at the same place in the circuit as the signal derived from the transmitter is introduced in FIGS. 3 and 4, i.e., in mixer 18.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic resonance spectrometer apparatus including, means for immersing a gyromagnetic resonance substance in an alternating magnetic field and a DC magnetic field which latter field is directed at a substantial angle to the direction of the alternating magnetic field, means for modulating one of the aforementioned magnetic fields at a certain modulation frequency corresponding to the difference frequency between the gyromagnetic resonance frequency and the frequency of the AC magnetic field to excite FM gyromagnetic resonance of the substance, such resonance having a carrier frequency component and FM sideband components, means for detecting the carrier component of the excited FM general magnetic resonance and eliminating therefrom all FM sideband components to produce an output signal having enhanced signal-to-noise ratio.

2. The apparatus according to claim 1 wherein said field modulating means modulates the DC magnetic field.

3. The apparatus according to claim 2 wherein the modulation index of the frequency modulation is less than 1.0 whereby the detected fundamental component of the FM resonance is of substantial amplitude compared to the amplitude of the FM sideband components.

4. The apparatus according to claim 3 wherein the modulation index is within the range of 0.1 to 0.5.

5. The apparatus according to claim 2 wherein said resonance detecting and sideband eliminating means includes, means for picking up the FM resonance signal emanating from the gyromagnetic bodies, means for heterodyning the FM resonance signal with a signal having a frequency displaced in frequency from the carrier of the FM resonance by the modulation frequency to translate the carrier resonance frequency component to a beat signal at the modulation frequency, and filter means connected in circuit between said pickup means and said heterodyning means for passing the carrier resonance frequency component and rejecting the spectral energy associated with a certain second FM sideband which would otherwise produce a beat frequency in the output of said heterodyning means at the modulation frequency.

6. The apparatus according to claim 5 wherein said resonance detecting and sideband eliminating means also includes, a phase sensitive detecting means for comparing the phase of the field modulation signal at the modulation frequency with the beat signal output derived from said heterodyning means to produce a phase sensitive DC output corresponding to the FM carrier component while eliminating other FM sideband components of the resonance signal.

7. The apparatus according to claim 5 including second heterodyning means for heterodyning a local oscillator signal with the picked up resonance signal to translate the FM resonance signal to a lower intermediate frequency, and wherein said filter means is connected in the intermediate frequency portion of the circuit between said second and first heterodyning means, whereby said filter means may be tuned to a lower frequency to facilitate fabrication and enhance performance thereof.

8. The apparatus according to claim 7 wherein said filter means is a band reject filter tuned to reject the second FM sideband component.

9. The apparatus according to claim 7 wherein said filter means is a band pass filter tuned to pass the carrier component of the FM resonance signal.

10. The apparatus of claim 2 wherein said resonance detecting and sideband eliminating means includes, means for picking up the FM resonance signal emanating from the gyromagnetic bodies, means for producing a single sideband of the alternating magnetic field at a frequency of the carrier component of the FM resonance signal, and a phase sensitive detector means for comparing the generated single sideband signal with the FM resonance signal to obtain a DC resonance signal containing essentially only the resonance information impressed on the FM resonance carrier component while eliminating all the FM sideband signals and the noise bandwidth contained within their respective spectral zones.

References Cited

UNITED STATES PATENTS 3,173,084   3/1965   Anderson _____ 324—0.5

RUDOLPH V. ROLINEC, *Primary Examiner.*

MICHAEL J. LYNCH, *Assistant Examiner.*